United States Patent [19]
Trostyanskaya et al.

[11] 3,821,054
[45] June 28, 1974

[54] METHOD OF CHEMICAL BONDING OF POLYIMIDE POLYMERS

[76] Inventors: Elena Borisovna Trostyanskaya, Ulitsa Gotralda, 20, Kv. 38; German Vyacheslavovich Komarov, Ulitsa Bolshaga Pochtovaga, 18/20, Karpus 5 Kv, 149; Jury Sergeevich Tsarakhov, Ulitsa Nagornaga, 27, Korpus 32, Kv. 59, all of Moscow, U.S.S.R.

[22] Filed: Oct. 15, 1971

[21] Appl. No.: 189,782

[52] U.S. Cl. ............... 156/308, 156/326, 156/331, 161/188, 161/227
[51] Int. Cl. ............................................. C09j 5/00
[58] Field of Search ........... 156/331, 308; 161/227, 161/188; 260/78 R, 77.5 NC, 563 R, 326

[56] References Cited
UNITED STATES PATENTS

| | | | |
|---|---|---|---|
| 3,361,589 | 1/1968 | Lindsey | 117/118 |
| 3,449,193 | 6/1969 | Bratton et al. | 156/322 |
| 3,627,624 | 12/1971 | Kreuz et al. | 161/165 |
| 3,697,345 | 10/1972 | Vaughan et al. | 156/155 |
| 3,699,075 | 10/1972 | Lobowitz | 260/49 |

*Primary Examiner*—Douglas J. Drummond
*Assistant Examiner*—M. G. Wityshyn
*Attorney, Agent, or Firm*—Eric H. Waters

[57] ABSTRACT

A method for chemically bonding polyimide articles characterized in that polyfunctional substances, for example polyamines, polyisocyanates and others are supplied to the surfaces to be bonded and the surfaces are then pressed together with heating. The said polyfunctional substances react chemically with the functional groups of polyimides to form chemical bonds between the surfaces to be bonded, to the effect of producing high-strength seams that can work within a wide range of working temperatures for polyimides.

11 Claims, No Drawings

METHOD OF CHEMICAL BONDING OF POLYIMIDE POLYMERS

This invention relates to methods for bonding polymeric materials, more particularly to methods for bonding polyimide polymers and still more particularly to a method for chemical bonding of polyimide polymers.

Polyimides distinguish advantageously from other thermally stable and solidified chemically stable plastics by their high mechanical and electric insulating properties and also by the resistance to radiation within the range of temperatures from −200° to +400°C.

However the absence of a dependable method for bonding polyimide polymers narrows the field of application of these materials whose remarkable properties, and above all the high thermal stability have attracted the attention of designers and engineers.

Polyimides belong to materials that are not bonded well with glues or by the diffusion welding method.

The difficulty of gluing resides in that it is practically impossible to select an adhesive, except a polyimide adhesive, that would match the thermal stability and other properties of the material to be bonded.

The failure of diffusion welding is explained on the basis that the polyimide polymers are destroyed before the temperature, at which the polymers will flow together, is attained.

Methods known in the prior art concern mostly gluing of polyimide polymers, but there is no suggestion of methods for chemical bonding of polyimides.

U.S. Pat. No. 3,455,774 describes a method for sealing polyimides wherein the polyimide polymers are first laminated with thermally stable plastic materials which soften on heating, for example with polytetrafluoroethylene or copolymers of tetrafluoroethylene.

This method of bonding polyimide polymers has the following disadvantages. The mechanical and electrophysical properties of laminated films at high temperatures are inferior to those of non-laminated polyimide. The thickness of a laminated film increases and the cost of the material grows. In order to improve adhesion of the fluoroplastic laminate to the base polyimide, the former should be modified, which involves additional expenditures. And what is more important, the articles bonded through the laminate cannot reliably work within a wide range of temperatures, that is under the conditions which the polyimides would be expected to withstand. The strength of a seam of the polyimide film laminated with the tetrafluoroethylene copolymer is zero after ageing at 200°C for 50 days.

In order to ensure sufficiently strong adhesion of the materials, the surfaces to be glued together should be modified with substances that destroy the "stepped" structure of polyimides. These substances are 50–100 percent solutions of hydrazine (See French Patent No. 1,543,501) or 5–30 percent solutions of various compounds of alkali metals and quaternary ammonium compounds (U.S. Pat. No. 3,361,589). This is a very complicated multi-step and time-consuming process connected with the use of aggressive media and strict adherence to safety regulations.

Seams possessing heat resistance close to that of polyimides can be obtained only with the use of solutions of polyamido acid as the glue, which is also time-consuming since the solutions should be kept for lengthy periods of time to remove the solvent. The complete imidization of the polyamido acid is attained only after a lengthy heat treatment (one-hour treatments at 100°, 200° and 300°C).

Bonding with the use of cross-linked polyimide polymers (U.S. Pat. No. 3,422,861) is characterized by the same drawbacks as is the base with the linear structure polyimides.

In view of the above considerations the search for new and more reliable methods for cementing polyimides still continues.

The object of this invention is to work out a method for bonding polyimide polymers which would be devoid of the above drawbacks and would ensure high strength of bonding within a wide range of temperatures without detriment to the other valuable properties of the plastic material and would be simple in use and practicable for various branches of industry.

The object has been realized by a method whose essence is chemical bonding of polyimides at the point of contact of the surfaces to be bonded.

This method according to the invention consists in that polyfunctional substances capable of reacting with the functional groups of polyimides are applied to the cleaned surfaces to be bonded. Thus the treated surfaces are then joined tightly together and heated so that chemical bonds form between the polyimide and said substance with the effect of cementing the surfaces. The seam of the chemically bonded material is cooled under pressure.

Polyamines, polyisocyanates, polybasic acids, their anhydrides and chloroanhydrides, esters and hydroxy compounds, separately or taken together, can be used as the polyfunctional substances capable of reacting chemically with polyimides. Preference should be given to polyamines or polyisocyanates which are characterized by high reactivity towards polyimides, and particularly hexamethylene diamine or hexamethylene diisocyanate which are easily available, can be easily applied to the surface of polyimides and ensure high quality of bonding.

The said substances can be applied by various methods, for example with a brush or tampon, by pouring over from a slit nozzle, by dipping or spraying.

Before application to the polyimide surfaces to be bonded, the polyfunctional substances should be preliminarily dissolved in an organic solvent that easily evaporates at room or elevated temperature and wets the surface of the polyimide. Preference should be given to acetone which dissolves many of the recommended polyfunctional substances without reacting with them, and easily evaporates at room temperature.

The concentration of acetone in the solution of polyfunctional substances depends on a few factors, namely, the type of said substances, the method of its application, etc. It has been established that good results can be attained with a 15 percent solution of hexamethylene diamine and a 10 percent solution of hexamethylene diisocyanate in acetone.

The surfaces to be bonded are air dried at room or elevated temperature to remove the solvent. In the latter case the solvent is evaporated more quickly. At room temperature the drying continues for 5 – 10 minutes, whereas at a temperature of 55°C the time is reduced to 1 – 2 min.

The surfaces to be bonded are brought in contact at a pressure from 10 to 80 kg/sq.cm. depending on the form of the seam, its length, type of polyimide and many other factors. In order to ensure strong lap seams having high shear resistance, 10–50 kg/sq.cm pressure will suffice. Sufficient strength of T-seams which would withstand delaminating stress is ensured at pressures from 50 to 80 kg/sq. cm. In order to ensure uniform pressure over the entire length of the seam it is necessary to use elastic straps of thermally resistant material, for example rubber.

The heating temperature varies from 150 to 400°C depending on the type of polyimide and polyfunctional substance used. The heating time varies from 0.5 to 5 minutes.

The best results are obtained with heating by low-inertia heaters.

The bonded material should be cooled under pressure to a temperature from 40° to 60°C. Cooling can only be done with the heater switched off and with additional cooling, for example, with water passed through the heating chamber 6.

After the material has been cooled, it can be removed from under the heater.

Articles of polyimide having the linear, cross-linked and loose-net structures, which may be in the form of films, fibers, fabric or molded parts, can be chemically bonded by the described method.

The advantage of said method of bonding polyimides consists in that owing to formation of the chemical bonds between the surfaces, high strength of the bond can be ensured in the entire range of the working temperatures of polyimides. During testing the bonded seam, its shear strength was equal to the tensile strength of the bonded polyimide film itself. The bonded seams are characterized by tightness of the seal, thermal stability, resistance to the action of liquid media. At the same time, the process for chemical bonding of polyimides is characterized by low labor requirements, it rules out the special pretreatment of the surfaces to be joined, the productivity of the process compared with the known methods is higher and no special skill is required on the part of the operators. The method is applicable for industrial use; it may be effected with the equipment intended for contact-heat welding; it improves the labor conditions compared with the process of gluing, and is profitable from the economical point of view. The properties of the material in the seam almost do not change.

A practical embodiment of the proposed method may be as follows. A polyimide article, for example film, produced on the basis of, for example, pyromellitic acid dianhydride and 4,4'-diaminodiphenyl ether, is cleaned on the surfaces to be bonded by wiping with a tampon soaked in acetone. Then a solution of hexamethylene diamine in acetone is applied to both surfaces by pouring over from a slit nozzle. The surfaces are exposed for a period of time, then pressed together to form a lap joint, and placed between welding electrodes of the contact-heating welding apparatus which press the films and heat them. After thus treating the films in the specified conditions, they are cooled and relieved of the pressure.

In order to make the invention more understandable for those skilled in the art, practical examples of embodiment of the proposed method are given by way of illustration.

Example 1

Two pieces of film on the basis of pyromellitic dianhydride (I) and 4,4'-diaminodiphenyl ether (II), 50 microns thick and having a tensile strength of 1,200 kg/cm$^2$ at 20°C were taken. The film surfaces were wiped with a tampon soaked in acetone, and a 15 percent solution of hexamethylene diamine in acetone was then applied to the surfaces to be bonded. Consumption of the 15 percent solution was calculated so that 0.25 mg dry substance was applied to one square centimeter of the seam surface. The films were air dried at a temperature of 55°C for two minutes, then pressed together to form a lap joint (the lap length of 5 mm) and placed between welding electrodes. The contact pressure of the surfaces to be bonded was 30 kg/sq.cm. The bonding temperature was 200°–205°C. The heating time was 2.5 minutes. The films were cooled under the same pressure to a temperature of 40°C and then removed from the press. In order to test the seam, 15-mm wide specimens were cut out of the films and tested by stretching at room or at elevated (to 350°C) temperatures. In all cases the specimens broke in the base material. The strength of the seam was close to the tensile strength of the material.

Example 2

Two pieces of film on the basis of substances I and II specified in Example I, 25 microns thick and having a tensile strength of 1,200 kg/sq.cm at 20°C were cleaned with a tampon soaked in acetone, and a 10 percent solution of hexamethylene diisocyanate (III) in acetone was applied to the surfaces to be bonded (0.2 mg dry substance per sq.cm., of seam surface). After air drying at room temperature for ten minutes the films were pressed together and placed in between the welding electrodes. The pressure on the surfaces to be bonded was 20 kg/sq.cm., the temperature raised to 220°C and the films were kept at this temperature for 2 minutes. After cooling to 40°C at said pressure the bonded films were removed from under the press electrodes. The bonded films were aged at 325°C for 100 hours and tested for shear at 20°C. The shear strength was 96 percent of the initial strength before aging.

Example 3

Two pieces of polyimide film manufactured on the basis of substance I and diaminodiphenyl sulfide, 20 microns thick, were coated with a 20 percent solution of triphenyl - 4,4',4''-triisocyanate (0.2 mg substance per 1 sq.cm seam surface). After air drying to remove the solvent, the surfaces were brought together at a pressure of 15 kg/sq.cm and heated in the welding apparatus at a temperature of 180°C for 3 minutes. During testing the bonded films for delamination, the specimens broke in the base material at 220 g/cm effort.

Example 4

Polyimide films 40 microns thick were bonded under the conditions specified in Example 1, except that a 10 percent solution of adipic acid in ethyl alcohol was applied to one of the surfaces to be bonded, whereas a 10 percent solution of hexamethylene diamine in acetone was applied to the other surface. After air drying at room temperature the films were pressed together at 15 kg/sq.cm and heated at a temperature of 260°C for 3 minutes. During the test for shear the specimen broke in the base material in the zone of the seam.

For the purpose of comparison we bonded polyimide materials with a monofunctional substance which does not form chemical bonds between the surfaces of the materials.

To this end we cleaned two pieces of 40 micron thick polyimide films manufactured on the basis of substances I and II, specified in Example 1, and applied a solution of diphenylamine in acetone. After evaporation of the acetone, the treated surfaces were brought together and heated at 220°C and a pressure of 50 kg/sq.cm for 3 minutes. The pieces of the film easily separated under the action of insignificant shear and delaminating stresses.

What is claimed is:

1. A method for chemically bonding polyimide articles to each other comprising cleaning the polyimide surfaces to be bonded, applying to the cleaned surfaces a solution of a polyfunctional compound capable of reacting chemically with the functional groups of the polyimides, pressing together the surfaces to be bonded under a pressure of from 10 to 80 kg/sq.cm., heating the pressed surfaces at a temperature and during a time sufficient to form chemical bonds between the polyimide surfaces and said polyfunctional compound, and cooling the bonded polyimide article under said pressure.

2. A method according to claim 1 wherein the polyfunctional compound is a low molecular weight polyfunctional compound.

3. A method according to claim 1 wherein the polyfunctional compound is a single monomeric compound.

4. A method according to claim 1 wherein the polyfunctional compound is selected from the group consisting of hexamethylene diamine, hexamethylene diisocyanate and triphenyl-4,4′,4″-triisocyanate.

5. A method according to claim 1, in which the polyfunctional compound is selected from the group consisting of polyamines and polyisocyanates.

6. A method according to claim 1, in which the polyfunctional compound is applied to the cleaned surfaces in the form of a solution in an organic solvent which evaporates easily at room or elevated temperature and is capable of wetting the polyimide surface.

7. A method according to claim 1, in which, the pressed surfaces to be bonded are heated at a temperature from 150° to 400°C for 0.5 to 5 minutes.

8. A method according to claim 1, in which the bonded surfaces are cooled to a temperature of 40°–60°C under a pressure from 10 to 80 kg/sq.cm.

9. A method according to claim 1, in which the polyimide is a polymer manufactured on the basis of pyromellitic acid dianhydride and 4,4′-diaminodiphenyl ether.

10. A method according to claim 1, in which the polyimide articles are in the form of films, fibers, fabric or molded parts.

11. A method for chemically bonding polyimide film based on pyromellitic acid dianhydride and 4,4′-diaminodiphenyl ether to itself, comprising cleaning the surfaces to be bonded, applying to the cleaned surfaces to be bonded a bonding agent consisting essentially of a 15 percent hexamethylene diamine solution in acetone in the amount of 0.25 mg dry substance per square centimeter of the surface to be bonded, air-drying to remove the solvent, pressing the surfaces to be bonded at a pressure of 30 kg/sq.cm, and heating at a temperature of 195°–220°C for at least 2 minutes at said pressure.

* * * * *